United States Patent [19]

Baeuerle et al.

[11] Patent Number: 4,900,892
[45] Date of Patent: Feb. 13, 1990

[54] METHOD FOR WORKING MEMBERS COMPOSED OF OXIDE MATERIAL

[75] Inventors: Dieter Baeuerle, Altenberg; Michael Eyett, Linz, both of Austria; Helmut Thomann, Munich; Wolfram Wersing, Kirchheim, both of Fed. Rep. of Germany

[73] Assignee: Siemens Aktiengesellschaft, Berlin and Munich, Fed. Rep. of Germany

[21] Appl. No.: 199,526

[22] Filed: May 27, 1988

[30] Foreign Application Priority Data

Jun. 1, 1987 [DE] Fed. Rep. of Germany ....... 3718323

[51] Int. Cl.$^4$ .............................................. B23K 26/00
[52] U.S. Cl. ................................................ 219/121.85
[58] Field of Search ...................... 219/121.68, 121.69, 219/121.6, 121.85, 121.67, 121.72

[56] References Cited

U.S. PATENT DOCUMENTS

| | | | |
|---|---|---|---|
| 4,021,898 | 5/1977 | Willis et al. | 219/121.69 X |
| 4,490,210 | 12/1984 | Chen et al. | 219/121.69 X |
| 4,598,039 | 7/1986 | Fischer et al. | 219/121.68 X |
| 4,666,552 | 5/1987 | Baeuerle | 219/121.69 X |
| 4,672,254 | 6/1987 | Dolat et al. | 219/121.69 X |
| 4,738,602 | 4/1988 | Yamamoto et al. | 219/121.69 X |

FOREIGN PATENT DOCUMENTS 3437056  4/1986  Fed. Rep. of Germany .

OTHER PUBLICATIONS

"Materialbearbeitung mit Excimerlasern", dated Jul. 1, 1985, from Lambda Physik GMBH, pp. 1-3.
"Laser Processing and Diagnostics", Springer-Verlag, Berlin, Heidelberg, New York, Tokyo, 1984, pp. 1-4, by D. Bauerle.

*Primary Examiner*—C. L. Albritton
*Attorney, Agent, or Firm*—Hill, Van Santen, Steadman & Simpson

[57] ABSTRACT

A method for working an oxide material, and preferably a ceramic oxide material, with a laser emission of an excimer laser and without the creation of damage layers includes pulsing the laser emission to be impinged on the material to be worked.

5 Claims, 1 Drawing Sheet

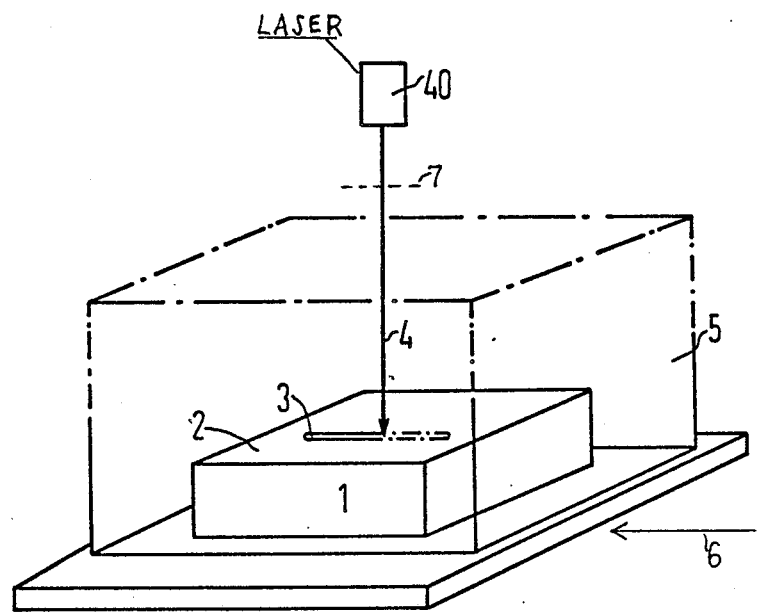

METHOD FOR WORKING MEMBERS COMPOSED OF OXIDE MATERIAL

BACKGROUND OF THE INVENTION

1. Field of the Invention

The present invention is directed generally to a method for cutting and shaping members composed of an oxide material using a laser emission.

2. Description of the Related Art

German published application No. 34 37 056 discloses an etching method for manufacturing structures in the surface of a member composed of oxide ceramic and oxide single crystal materials having dielectric properties and the like. In accordance with the known method, the oxide material is impinged with a laser beam in a atmosphere that has a reducing effect on the oxide material at higher temperatures. By directing the laser beam onto the material, elevated temperatures are produced in the material.

For a ceramic oxide material, for example, piezoelectric and/or pyroelectric materials and preferably for materials composed of lead-/calcium-/barium-/-titanate/-zirconate-/-tantalate and the like, hydrogen is particularly suitable as an atmosphere, or at least as a constituent of the atmosphere, having a reducing effect at higher temperatures.

In particular, the use of an ion laser of argon, of krypton and the like, or the emission from a $CO_2$ or Nd:YAG laser is well known in such applications. These types, of lasers are extremely high-performance lasers.

Extremely small members of an oxide material, for example, extremely small piezoelectric transducer elements, can be worked with the known method. Such working, in particular, may include cutting the material whereby the width of the cut is in the micrometer range, a relatively great cutting depth can be realized-as well. In comparison to mechanical working and forming, relatively smooth worked surfaces, for example, smooth cut surfaces, are produced with this known working method.

The processing performance achieved by the known method actually leaves no wishes unsatisfied. Compared to purely mechanical working such as sawing, the processing speed of the known method as disclosed in the afore-mentioned German application is significantly higher.

The dielectric, piezoelectric and pyroelectric properties of individual oxide materials are adequately known. However, it has been found that when members of oxide materials are worked with the known method the standard values for these properties are not present as the result of deviations in the values, particularly for materials whose chemical compounds are less stable, for instance, in comparison to the dielectric material aluminum oxide ceramic. Such deviations from the standard values occur to different degrees. It has been found that these deviations are caused by the degree of working of the material. A conclusion drawn therefrom is that the known working methods causes a modification of the material, particularly in the regions of and near the working surfaces, for example, in the regions adjacent the cut surfaces.

SUMMARY OF THE INVENTION

It is an object of the present invention to provide a method to overcome or eliminate the above-described disadvantage while continuing to guarantee stability and reproducibility of the physical properties of the appertaining oxide materials.

This and other objects are achieved in a method including the steps of directing a laser emission having a wavelength in air of less than 350 nanometers onto the member, pulsing the laser so that only pulses of laser energy impinge the member, and relating the pulse duration, pulse repetition rate, and pulse energy to one another so that significant harmful heat accumulations in the material being processed are avoided in a near region of the processing zone. Further developments and improvements of the invention include using an excimer laser, or using an Nd:YAG laser having frequency multiplication to generate the laser emission. The working of the material may occur either within a housing, or may occur in an air atmosphere. The material to be worked may be of a perovskite material, and more particularly a compound containing lead and titanium, and specifically a material which is composed of lead zirconatetitanate. Alternately, the material to be worked, is a piezoelectric material having a spinel structure that, in particular, is lithium niobate ($LiNbO_3$). The present method is also applicable to work a high temperature superconductor material such as cuprates of barium, strontium, bismuth and the like.

The success achieved with the present method is apparently based on avoiding the reducing action, or reduction, which occurs in the known method. This is based on the use of a laser emission having a wavelength (in air) which is lower than about 0.35 micrometers or, respectively, greater than about 3 eV. When a laser emission having these characteristics is pulsed at a pulse duration of a few nanoseconds through microseconds, then working of an oxide material using such laser emission leaves no damage layer in the worked region.

The following lasers are suitable for use in the above recited wavelength region in accordance with the present invention:

| Laser type | Wavelength (nm) | Pulse Length (range) | C.W. Power/Pulse Energy Less Than/Equal to |
| --- | --- | --- | --- |
| F | 157 | ns | 2 W; 0.025 J |
| ArF | 193 | ns | 10 W; 0.5 J |
| KrCl | 222 | ns | 10 W; 0.2 J |
| KrF | 248 | ns | 25 W; 1.0 J |
| XeCl | 308 | ns | 8 W; 0.5 J |
| Xef | 351 | ns | 7 W; 0.4 J |
| Nd:YAG | 354.7 | ns, s | 10 |
| Nd:YAG | 266 | ns, s | 4 J |

The Nd:YAG lasers having wavelengths of 354.7 and 266 nm involve frequency-doubled, or frequency-tripled lines. As is known, such frequency multiplication occurs by using a substance which is optically non-linear in the beam path of the laser resonator.

Pulse lengths in the region of a few nanoseconds through microseconds, and preferably between 1 to 15 nanoseconds, are used in accordance with the method of the present invention. The repetition rate of the pulses, the pulse length, and the pulse power are dimensioned relative to one another so that no significant damaging heat accumulation, and preferably no heat accumulation at all, occurs in the material of the member being worked in the near region of the working zone. Damaged layers and other disruptive effects are suppressed using a laser emission on the material which does not occur continuously but only occurs during brief, intense pulses since no significant heat flow from the working location to the adjoining material occurs. An acting time of the laser emission having a duration of a view nanoseconds through microseconds may also be achieved by appropriately fast deflection of a continuous laser emission. Working or structuring the material of the appertaining member occurs by relative movement of the focused laser beam and member relative to one another. A masked contact irradiation or projection irradiation can also be implemented. The depth and cross sectional shape of the structure being produced in the body of the member is varied within broad ranges on the basis of the working parameters. In particular, the working parameters include variation of the laser intensity, the pulse sequence, and the pulse number so that all processing dimensions are realized and executed. Processing dimensions which are achievable with the present method are not possible with mechanical working methods.

The working is carried out in air in accordance with the method of the present invention. However, the working can also be more expediently performed in a vacuum or in a selected atmosphere, such as an atmosphere enriched with oxygen. This latter measure suppresses disturbing reduction of the chemical compound of the worked material. It is recommended to isolate the material or the location of the work occurance from the environment with respect to the atmosphere when there is considerable volatilizations of the material, for example of a lead compound. Such safety measure is adequately known in and of itself from the manufacture of lead titanate ceramic.

Members of piezoelectric ceramic that are used for ultrasound arrays and are currently still being structured and worked by fine mechanical sawing are produced, for example, with a method according to the present invention. In comparison to mechanical working, there is practically no restriction on the cut profile and/or the surface quality of the cut surfaces in view of the cut width available with the present invention.

Other advantageous applications of the present method are for manufacturing relatively complex structures, which, for example, have closely adjacent bores or which have circular and angular segments. The present invention provides a definable adjustment of the cross sectional profiles of the member being worked. Mere erosion of the surface layers of the member may also be performed in the working method implementable with the present invention.

A method of the present invention avoids the occurance of micro-cracks which can occur during mechanical working and which do not become perceptible until after a somewhat long operation time of, for example, an ultrasound transducer when the member being worked is used in ultrasound applications. This is because such micro-cracks that can generally not be discovered in advance but become larger to a dangerous and disasterous extent due to the constant oscillatory stressing.

BRIEF DESCRIPTION OF THE DRAWINGS

The Figure is a schematic perspective view showing an apparatus for practicing the present method.

DESCRIPTION OF THE PREFERRED EMBODIMENTS

In the Figure is shown the principle of an arrangement for implementing the method of the present invention. A member 1 composed of a ceramic or single crystal oxide material to be processed is, for example, a piezoelectric lead zirconate titanate or the like. Such piezoelectric, pyroelectric and/or dielectric materials enjoy wide-spread acceptance for use as piezo transducers in ultrasound equipment, as pyro-sensors in radiation detectors and as dielectric in capacitors. A surface 2 of the member 1 to be worked is being provided with a structure in the form of a depression 3 extending into the surface 2 in the exemplary figure. A preferably pulsed laser beam 4 emitted from a laser 40 which is, for example, an excimer laser or a Nd:YAG laser impinges the member 1. An optional surrounding housing 5 is used, for example, to retain volitalizations during the working process.

During the practice of the present invention, and particularly during the use of excimer lasers, preheating as occurs in the prior art methods is advantageously avoided.

For the sake of clarity, the Figure shows only schemmatically a motion mechanism 6 for providing a relative motion between the laser beam 4 and the member 1, and optical devices 7 for the structured masking of the laser beam or emission 4 or projection of the structure to be worked. Numerous embodiments of such motion mechanisms 6 and optical devices 7 are already used in the known processing methods.

As an example, a lead zirconate titanate material is etched with a radiation of wavelength 308 nanometers emitted by an XeCl excimer laser. The threshold for such etching in air lies at approximately 2 $J/cm^2$. An etching rate of approximately 0.1 micrometers per laser pulse is achieved with an emission of 10 $J/cm^2$. The work is carried out with a repetition rate of 10 Hz. for the laser pulses. A pulse duration of a few nanoseconds, and preferably up to approximately 15 nanoseconds, is utilized in the exemplary embodiment.

Thus, there is disclosed a method for working members composed of oxide material in which undesirable deviations of the physical characteristics from standard values in the regions being worked are avoided. Excessive heating of the material is prevented by the use of pulsed laser emissions, and reduction of the oxide material is avoided by working the material in air or in an atmosphere containing oxygen.

Although other modifications and changes may be suggested by those skilled in the art, it is the intention of the inventors to embody within the patent warranted hereon all changes and modifications as reasonably and properly come within the scope of their contribution to the art.

We claim:

1. A method for working members composed of a perovskite material selected from the group consisting of lead-, calcium-, barium-, titanate, -zirkonate, -tantalate, and high-temperature superconductor material, comprising the steps of:

directing a laser emission having a wavelength in air of less than approximately 350 nm onto a processing zone of a member to be worked;

pulsing the laser emission so that only pulses of laser energy impinge the member to be worked; and relating a pulse duration, a pulse repetition rate and a pulse energy to one another so that significant harmful heat accumulation is avoided in the member to be worked in a near region of a processing zone.

2. A method as claimed in claim 1, further comprising a step of using an excimer laser to generate the laser emission.

3. A method as claimed in claim 1, further comprising the steps of:

using a Nd:YAG laser to generate the laser emission; and frequency multiplying the laser emission of the Nd:YAG laser.

4. A method as claimed in claim 1, further comprising the step of:

enclosing the material in a housing during working.

5. A method as claimed in claim 1, further comprising the step of: performing working of the material in air.

* * * * *